US012634647B1

(12) United States Patent
Wood

(10) Patent No.: US 12,634,647 B1
(45) Date of Patent: May 19, 2026

(54) THREADED HEARING AID DOME CONNECTION

(71) Applicant: John Wood, N. Canton, OH (US)

(72) Inventor: John Wood, N. Canton, OH (US)

( * ) Notice: Subject to any disclaimer, the term of this patent is extended or adjusted under 35 U.S.C. 154(b) by 252 days.

(21) Appl. No.: 18/374,968

(22) Filed: Sep. 29, 2023

Related U.S. Application Data

(60) Provisional application No. 63/444,201, filed on Feb. 8, 2023, provisional application No. 63/432,908, filed on Dec. 15, 2022.

(51) Int. Cl.
*H04R 25/00* (2006.01)

(52) U.S. Cl.
CPC ......... *H04R 25/656* (2013.01); *H04R 25/604* (2013.01); *H04R 25/609* (2019.05)

(58) Field of Classification Search
CPC ... H04R 25/656; H04R 25/609; H04R 25/604
See application file for complete search history.

(56) References Cited

U.S. PATENT DOCUMENTS

| | | | | |
|---|---|---|---|---|
| 6,129,174 A * | 10/2000 | Brown | ................. | H04R 25/656 381/325 |
| 2015/0063612 A1* | 3/2015 | Petersen | ................ | H04R 25/50 381/313 |

* cited by examiner

*Primary Examiner* — Sunita Joshi
(74) *Attorney, Agent, or Firm* — Renner, Kenner, Greive, Bobak, Taylor & Weber Co., LPA

(57) ABSTRACT

A hearing aid device is provided that has a body housing a microphone electrically connected to an amplifier. A receiver, in communication with the amplifier, receives an electrical signal converted from sound. A unique feature of the device is the inclusion of a dome, designed to contact within the ear, which is removably attachable to the receiver via a threaded connection mechanism. This mechanism can either be a direct male threaded attachment on the receiver that engages with a female thread within the dome or incorporate a dome insert with the female thread. The dome, typically bell-shaped, mushroom-shaped or umbrella shaped with a size range from 4 millimeters to 12 millimeters depending on individual comfort level and hearing loss, and formed of silicone or a similar material that offer flexibility, durability, and a good formability, can be efficiently detached by twisting between one to six rotations, facilitating easy cleaning or replacement. Made from material that's easily cleaned by a soft cloth, the dome ensures clarity in sound delivery and optimal hygiene for the user.

12 Claims, 2 Drawing Sheets

THREADED HEARING AID DOME CONNECTION

RELATED APPLICATIONS

The present application claims the benefit of U.S. Provisional Application Ser. No. 63/432,908, filed on 15 Dec. 2022 and U.S. Provisional Application Ser. No. 63/444,201, filed on 8 Feb. 2023, both incorporated by reference as if fully rewritten herein.

BACKGROUND OF THE INVENTION

1. Field of the Invention

The present invention relates generally to hearing aids and, more particularly, to an improved configuration for a hearing aid having a threaded connecting dome.

2. Description of the Related Art

Hearing aids are devices designed to improve hearing by making sound audible to a person with hearing loss. There are many types of hearing aids which vary in size, power and circuitry, with modern devices falling into one of two general categories: behind the ear (BTE); and, in the ear (ITE). In the ear aids (ITE) have device form factors that fit in the outer ear bowl (called the concha). Being larger, these are easier to insert and can hold extra features. ITE hearing aids are custom made to fit each individual's ear. Invisible-in-canal hearing aids (IIC) fit inside the ear canal completely, leaving little to no trace of an installed hearing aid visible. This is because it fits deeper in the canal than other types, so that it is out of view even when looking directly into the ear bowl (concha). A comfortable fit is achieved because the shell of the aid is custom-made to the individual ear canal after taking a mold.

Hearing aids, particularly the In-The-Ear (ITE), In-The-Canal (ITC) and Completely-In-The-Canal (CIC) styles, sit inside the ear canal, placing them in direct contact with earwax (cerumen) and moisture, which are naturally present in the ear. This close contact can lead to a few potential problems. Physical blockages may occur when earwax accumulates on the hearing aid, especially around the receiver and at the ear bud dome insert. This can lead to reduced sound clarity or even total blockages of sound. The user might experience this as muffled sound, reduced volume, or no sound at all. Earwax or moisture can alter the seal of the hearing aid in the ear canal. A poor seal can cause feedback, which sounds like a whistling or buzzing noise. This can be annoying and reduce the clarity of sounds. Also, prolonged exposure to moisture can potentially damage the internal electronics of the hearing aid. Moisture can corrode contacts, short-circuit components, or disrupt battery function. Over time, if earwax and moisture consistently interfere with the hearing aid, it can reduce the overall lifespan of the device, leading to earlier than expected replacement or repairs.

Many users, especially first-time wearers, may not be aware of the impact of earwax and moisture on their hearing aids. If they experience any of the above problems, they might mistakenly attribute them to a manufacturing defect or a design flaw. This can lead to several outcomes:

1. Unnecessary Returns: Believing the hearing aid is defective, users might return the device, which increases costs for manufacturers or distributors and leads to dissatisfaction for the user.

2. Dissatisfaction: The user might believe that hearing aids in general don't work well or aren't suitable for them, leading them to stop using such essential devices, which can have negative consequences for their quality of life.

3. Warranty Claims: A user might send the device for repair or replacement under warranty, believing it to be faulty. This can result in additional costs and administrative efforts for the manufacturer or distributor.

To minimize these issues, users should be educated about proper hearing aid maintenance. Regular cleaning, avoiding moisture-prone activities (like swimming) while wearing the device, and using drying kits can all help prevent earwax and moisture-related problems. However, of all existing designs currently available the ability to remove/replace the ear bud dome for cleaning is impeded. As shown in FIG. 1, a first PRIOR ART design is depicted in which the receiver terminates with a dome connector of a style that inserts within a receiving channel of the ear bud dome. Such a click dome style connection is frictionally impinged, where the dome must be aligned properly on the tip of the receiver while applying hard pressure to snap/click over the receiver. Such a click-dome style is difficult to align, while at the same time applying sufficient pressure needed to complete the connection is difficult and is extremely difficult to remove for cleaning one connected or connected with an adhesive, resulting in an ear bud dome that is not easily removable. Similar is a friction fit style where a dome slides over barbed projection receiver connection with a sleeve-like projection. Such a friction fit is difficult to manipulate, and difficult to make sure the connection is secure without causing an ear bud dome that can slide off the receiver and remain within the ear canal. Additionally, a custom fit ear mold made of a patient's ear using ear impression material requires the mold to be glued to hearing aid tubing, or in some cases the hearing aid receiver in order to create a custom fit ear mold. Such a method must be performed in the office by an audiologist or hearing aid professional and maintaining continuous office visits for maintenance cleaning. As shown in FIG. 2, a PRIOR ART design is depicted in which the dome connector is barbed, and when inserted within the receiving channel it remains affixed permanently, or in a manner that is extremely difficult to remove.

While audiologists and hearing care professionals can play a vital role in educating a user and demonstrating cleaning techniques, recommend cleaning tools and kits, and provide tips to prevent excessive earwax or moisture buildup, such a problem still results in millions of excess or unnecessary returns or user complaints. Further, with the ruling by the Food and Drug Administration (FDA) to make over the counter hearing aids available, an expanded market without professional education or service will exacerbate these issues.

An additional issue associated with wax/moisture filters that are currently used to help protect the receiver in most hearing aids results in the need to remove and reinsert in order to clean. Being extremely tiny and difficult to manipulate, especially for users of ages 60 to 70 and older, such filters need be replaced when the sound becomes weak or stops because wax and moisture has traveled into the receiver filter. It is the change in sound that alerts users they need to change the filter and dome. When wearing eyeglasses that never cleaning on a daily basis, after a week or a month a wearer's sight would go foggy and gets blurred. This does not take place because glasses are easily cleaned on a daily basis. In comparison, without an easy way of cleaning and replacing such filters the performance of the hearing aid will go weak or appear inoperable due to moisture or wax.

Consequently, a long felt and unresolved need exists for improvements that can alleviate problems associated with cleaning of hearing aids and filter contact components.

SUMMARY OF THE INVENTION

It is thus an object of the present invention to provide for the easy removal, cleaning and replacement of a hearing aid dome to a hearing aid receiver.

It is a feature of the present invention to provide a dome designed to be removably attachable to the receiver using a threaded connection.

The present invention provides a hearing aid device comprising a body housing a microphone electrically connected to an amplifier. A receiver, in communication with the amplifier, receives an electrical signal converted from sound. A unique feature of the device is the inclusion of a dome, designed to contact within the ear, which is removably attachable to the receiver via a threaded connection mechanism. This mechanism can either be a direct male threaded attachment on the receiver that engages with a female thread within the dome or incorporate a dome insert with the female thread. The dome, typically bell-shaped or mushroom-shaped and made of silicone, can be efficiently detached by twisting between one to six rotations, facilitating easy cleaning or replacement. Made from material that's easily cleaned by a soft cloth, the dome ensures clarity in sound delivery and optimal hygiene for the user.

It is an advantage of the present invention to provide easy detachability of the dome to facilitate cleaning, ensuring optimal hygiene and extended device life.

It is a further advantage of the present invention to provide user convenience and confidence in the simplified cleaning process due to the twist-to-detach mechanism and easy-to-clean material.

Further, the present invention creates a fast and easy quick method of accessing the filters by removing the receiver dome connection with a simple twist, even as often as on a daily basis to prevent wax and moisture from travelling into the receiver.

Further, the present invention provides the ability to clean or replace just the dome potentially reduces the need for frequent whole-device replacements and eliminates unwarranted returns or complaint.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
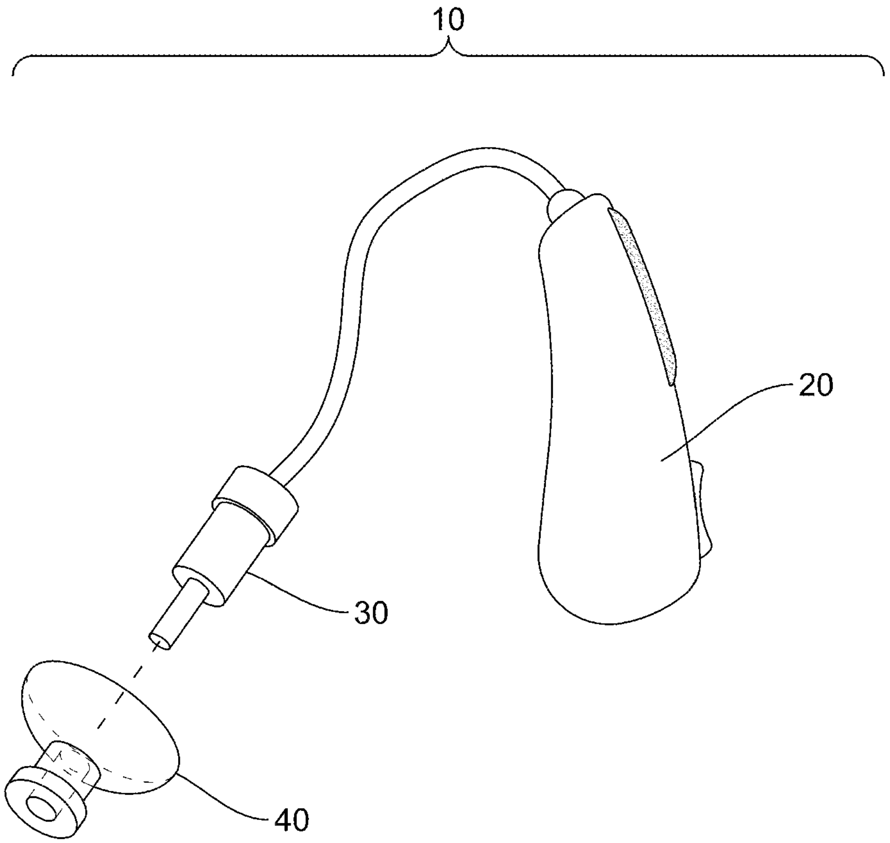
FIG. 1 PRIOR ART
FIG. 1 is a partial exploded perspective view of a hearing aid according to the PRIOR ART depicting a first dome connection design.
Figure 2:
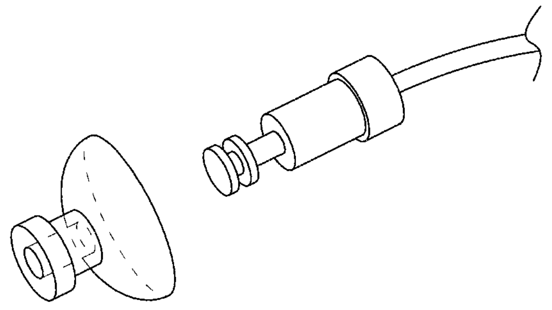
FIG. 2 PRIOR ART
FIG. 2 is a partial exploded perspective view of a hearing aid according to the PRIOR ART depicting a second dome connection design.
Figure 3:
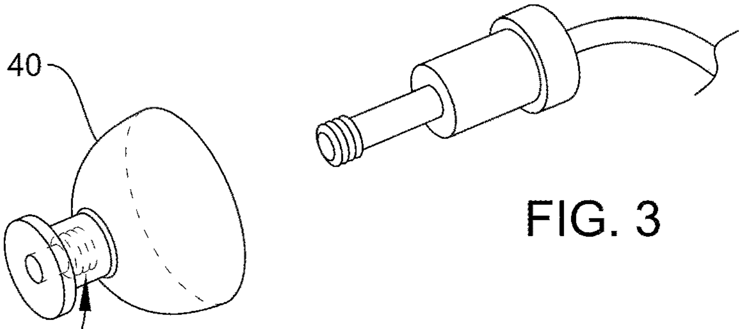
FIG. 3 is a partial perspective view of an improved in-canal style hearing aid configuration according to a first configuration for the preferred embodiment of the present invention.
Figure 4:
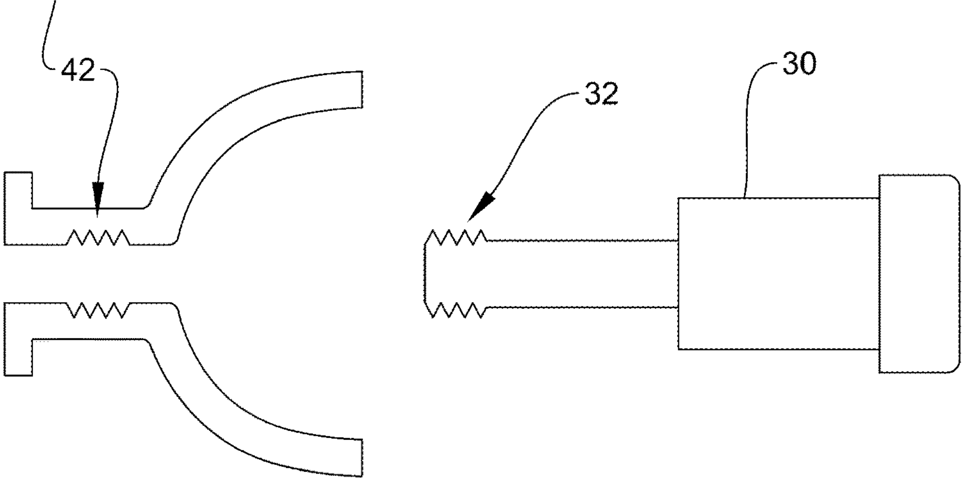
FIG. 4 is a cross sectional view taken along an axial centerline thereof.

The best mode for carrying out the invention is presented in terms of its preferred embodiment, herein depicted within the FIG. 3 through FIG. 6. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a hearing aid, generally noted as 10, is provided having a body 20 housing a microphone in electrical communication with an amplifier. The amplifier converts sound into an electrical signal and sends it to a receiver 30. Power for amplification may include a battery that powers the device.

The body 20 of the hearing aid is shown to be worn outside the ear, but may be adapted to fit within the ear, with a receiver 30 being close with the tympanic membrane within the ear canal. The receiver 30 connects to an ear bud or dome 40, a small bell-shaped or mushroom-shaped silicone piece that affixes to the speaker end of the receiver 30.

The dome 40, having contact within the ear, may be a component that is intermittently soiled by earwax, moisture, etc. The dome 40 will need to be removable in order to clean any audio impediments, or to replace them when worn out. As shown in conjunction with FIG. 3 and FIG. 4, a first threaded connection is depicted in which a female thread 42 within the dome 40 is threadingly engaged to a male threaded attachment 32 at the end of the receiver 30. In a preferred configuration a male threaded connection 32 may be formed at the receiver through direct molding, machining or any other functionally equivalent means. Similarly, the female threaded connection 42 may be similarly formed at the dome 40 such that the male connection 32 threadingly engages with the female connection 42 when attached.

Figure 5:
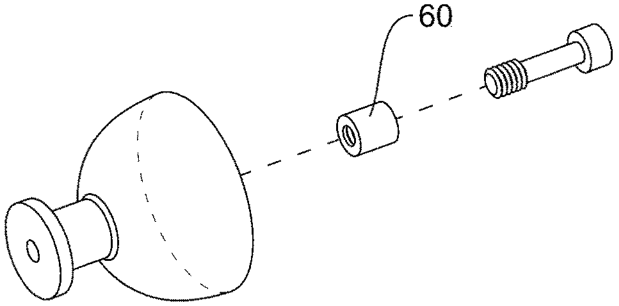
FIG. 5 is a partial perspective view of an improved in-canal style hearing aid configuration according to a second configuration for the preferred embodiment of the present invention.
Figure 6:
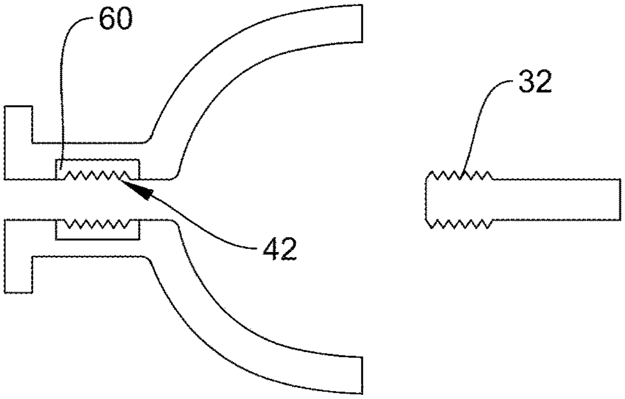
FIG. 6 is a cross sectional view taken along an axial centerline thereof.

As shown in conjunction with FIG. 5 and FIG. 6, a second style of threaded connection is depicted in which dome insert 60 is provided having the female thread 42 within the dome 40 is threadingly engaged to a male threaded attachment 32 at the end of the receiver 30. According to this design the male threaded connection 32 may be formed at the receiver through direct molding, machining or any other functionally equivalent means. And, the dome inserts 60 may be formed with a female threaded connection 42 and affixed to or over molded within the dome 40.

In either configuration the dome 40 threadingly engages with receiver 30 for attachment, detachment and replacement of the dome 30.

It should be apparent to those having ordinary skill in the relevant art, in light of the present teachings, that variations in the threaded connection may be incorporated broadly and equivalently within the scope of the present invention. In a preferred configuration, the threads 42 may be formed such that the dome 40 can be affixed or removed by twisting, preferably between one to six rotations, in order to rigidly affix the dome 40 into position.

It is intended that the dome 40 may be formed of a material that is cleaned by wiping with a soft cloth each night.

2. OPERATION OF THE PREFERRED EMBODIMENT

In operation, the dome 40 is affixed to the receiver 30 and inserted into the ear. Sound is then processed through a microphone and amplified to the receiver 30, where sound is delivered to into the ear. The speaker receives the electrical signal from the amplifier and converts it back into acoustic energy (sound). The dome 30 can be removed for cleaning by threadingly disengaging from the receiver and returned when clean.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

I claim:

1. A hearing aid comprising:

a body housing a microphone in electrical communication with an amplifier;

a receiver in communication with the amplifier, the receiver configured to convert electrical signals to sound; and a dome removably attachable to the receiver, wherein the receiver includes an external male threaded connector integrally formed at an output end of the receiver body, and the dome includes an internal female thread embedded within a rigid annular insert overmolded within a flexible silicone dome body, the female thread engaging the male threaded connector to form a releasable, fluid-tight acoustic seal by manual rotation, wherein the threaded connection is dimensioned and pitched to permit manual removal and reattachment by a user without tools, thereby allowing the dome to be periodically detached, rinsed with warm water, wiped, and dried to remove cerumen and moisture before re-use, reducing accumulation that can cause blockage, corrosion, or device failure.

2. The hearing aid of claim 1, wherein said removable dome is formed of a resilient material that provides flexibility, durability and formability.

3. The hearing aid of claim 1, wherein said threaded connection forms a helical structure in which between 1 to 6 rotations creates a mechanical attachment.

4. The hearing aid of claim 1, wherein the body is adapted to fit within the ear.

5. The hearing aid of claim 1, wherein the receiver is positioned close to or within the ear canal.

6. The hearing aid of claim 5, wherein the dome is a bell-shaped, umbrella-shaped or mushroom-shaped piece with a size range from between 4 millimeters to 12 millimeters and adjustable depending upon comfort and level of hearing loss.

7. A method for using the hearing aid of claim 1, comprising:

affixing said dome with a threaded connection to said receiver of the hearing aid;

inserting said dome into the ear;

processing sound through said microphone housed within said body of the hearing aid;

amplifying said sound to the receiver;

delivering said sound into the ear; and removing said dome for cleaning by threadingly disengaging it from said receiver.

8. The method of claim 7, further comprising the step of returning said dome to said receiver after cleaning.

9. The method of claim 7, wherein said dome is removed by twisting said dome between 1 to 6 rotations.

10. The hearing aid of claim 1, wherein the threaded connection mechanism comprises a separate adapter, said adapter having a first end configured to affix to said receiver and a second threaded end that engages with said thread within said dome.

11. The hearing aid device of claim 1, wherein the threaded connection mechanism comprises a threadable insert configured to be secured inside an opening of said receiver hele, said insert having a distal end with external threads to engage with corresponding internal threads in said dome.

12. The hearing aid device of claim 1, wherein the threaded connection mechanism comprises a threadable cap configured to fit over and be secured to a tip of said receiver, said cap having external threads to engage with corresponding internal threads in said dome.

* * * * *